(12) United States Patent
Huang

(10) Patent No.: US 10,389,811 B2
(45) Date of Patent: Aug. 20, 2019

(54) CLOUD DATA TRANSMISSION SYSTEM AND DYNAMIC DATA FLOW DECENTRALIZING METHOD THEREOF

(71) Applicant: UNIVERSAL SCIENTIFIC INDUSTRIAL (SHANGHAI) CO., LTD., Shanghai (CN)

(72) Inventor: Sheng-Chi Huang, Nantou County (TW)

(73) Assignee: UNIVERSAL SCIENTIFIC INDUSTRIAL (SHANGHAI) CO., LTD., Shanghai (CN)

( * ) Notice: Subject to any disclaimer, the term of this patent is extended or adjusted under 35 U.S.C. 154(b) by 198 days.

(21) Appl. No.: 15/369,965

(22) Filed: Dec. 6, 2016

(65) Prior Publication Data

US 2018/0041579 A1 Feb. 8, 2018

(30) Foreign Application Priority Data

Aug. 8, 2016 (CN) .......................... 2016 1 0642289

(51) Int. Cl.
*G06F 15/173* (2006.01)
*H04L 29/08* (2006.01)
(Continued)

(52) U.S. Cl.
CPC ...... *H04L 67/1097* (2013.01); *G06F 9/45533* (2013.01); *G06F 9/5083* (2013.01);
(Continued)

(58) Field of Classification Search
CPC ... G06F 9/45533; G06F 9/5083; H04L 67/10; H04L 67/1008; H04L 67/104; H04L 67/1097; H04L 67/12
(Continued)

(56) References Cited

U.S. PATENT DOCUMENTS 7,500,001 B2 * 3/2009 Tameshige ............ G06F 9/5011
709/223
8,296,398 B2 * 10/2012 Lacapra ............ G06F 17/30206
709/219
(Continued)

FOREIGN PATENT DOCUMENTS

CN 103856512 A 6/2014
CN 103959273 A 7/2014
WO WO 2008124984 A1 10/2008

*Primary Examiner* — Phuoc H Nguyen
(74) *Attorney, Agent, or Firm* — Li & Cai Intellectual Property (USA) Office

(57) ABSTRACT

A cloud data transmission system, comprising a static relay server, a dynamic relay server and a cloud server. The static relay server facilitates a plurality of user devices to conduct peer-to-peer data transmission. The dynamic relay server switches a working mode according to a working load of the static relay server and shares the working load of the static relay server. The cloud server dynamically coordinates the linkage among the static relay server, the dynamic relay server and the plurality of user devices. The dynamic relay server switches from a standby mode to an active mode when the working load of the static relay server is heavier than a predetermined load. At least two of the plurality of user devices are connected to a dynamic relay server to conduct data transmission through the dynamic relay server.

6 Claims, 11 Drawing Sheets

(51) Int. Cl.
*G06F 9/455* (2018.01)
*G06F 9/50* (2006.01)

(52) U.S. Cl.
CPC ............ *H04L 67/10* (2013.01); *H04L 67/104* (2013.01); *H04L 67/1008* (2013.01); *H04L 67/12* (2013.01)

(58) Field of Classification Search
USPC .................................................. 709/224, 226
See application file for complete search history.

(56) References Cited

U.S. PATENT DOCUMENTS

| | | | | |
|---|---|---|---|---|
| 8,763,091 | B1* | 6/2014 | Singh | H04L 63/083 726/12 |
| 8,868,790 | B2* | 10/2014 | Lovett | H04L 49/10 370/463 |
| 2005/0027892 | A1* | 2/2005 | McCabe | G06F 3/0626 709/253 |
| 2005/0132030 | A1* | 6/2005 | Hopen | H04L 67/1008 709/223 |
| 2007/0130341 | A1* | 6/2007 | Ma | G06F 1/26 709/226 |
| 2008/0229381 | A1* | 9/2008 | Sikka | H04L 63/102 726/1 |
| 2008/0301233 | A1 | 12/2008 | Choi et al. | |
| 2011/0258338 | A1* | 10/2011 | Vass | H04N 7/148 709/233 |
| 2012/0179801 | A1* | 7/2012 | Luna | H04L 61/1511 709/223 |
| 2014/0019661 | A1* | 1/2014 | Hormuth | G06F 15/17331 710/306 |
| 2014/0032644 | A1* | 1/2014 | Saxena | H04L 67/10 709/203 |
| 2015/0178137 | A1* | 6/2015 | Gordon | H04L 67/1008 709/226 |
| 2015/0180719 | A1* | 6/2015 | Wu | H04L 41/0896 709/224 |
| 2016/0065678 | A1* | 3/2016 | Yano | H04L 29/08639 709/228 |

* cited by examiner

CLOUD DATA TRANSMISSION SYSTEM AND DYNAMIC DATA FLOW DECENTRALIZING METHOD THEREOF

BACKGROUND

1. Technical Field

The present invention generally relates to a cloud data transmission system and, more particularly, to a cloud data transmission system and a dynamic data flow decentralizing method therefor, in which relay servers are dynamically added to decentralize the data flow.

2. Description of Related Art

In recent years, with the rapid development of the cloud technology, the current data transmission system is capable of facilitating various electronic devices to communicate through the cloud. Taking the Internet of Things (IOT) for example, the IOT enables peer-to-peer communication between various electronic devices.

As the variety of end devices becomes greater, the network environment between end devices becomes more and more complicated. The problems caused by network address translation (NAT) traversal have been an issue in the technology field. To overcome NAT traversal, a traversal using relay NAT (TURN) server has been developed to be installed in the Internet data center to cross NAT or a firewall to facilitate peer-to-peer communication.

However, the shortage of relay servers leads to heavier loads of the relay servers as well as lowered quality of service (QoS). Accordingly, the electronic devices as end devices have to wait until off-peak hours to conduct data transmission. To improve the quality of transmission, service providers have to increase the number of relay servers and widen the available bandwidth, which leads to higher operating cost and higher power consumption.

SUMMARY

One embodiment of the present invention provides a cloud data transmission system. The cloud data transmission system includes at least one static relay server, at least one dynamic relay server and a cloud server. The static relay server is connected to a plurality of user devices. The cloud server is connected to the static relay server, the dynamic relay server and the plurality of user devices. The static relay server is configured to facilitate the plurality of user devices to conduct peer-to-peer data transmission. The dynamic relay server is configured to switch a working mode according to a working load of the static relay server and share the working load of the static relay server. The cloud server is configured to dynamically coordinate the linkage among the static relay server, the dynamic relay server and the plurality of user devices so as to adjust the working load of the static relay server. When the working load of the static relay server is heavier than a predetermined load, the cloud server controls the dynamic relay server to switch from a standby mode to an active mode and at least two of the plurality of user devices are connected to the dynamic relay server to conduct data transmission through the dynamic relay server.

The static relay server and the dynamic relay server output respectively working status information to the cloud server at regular time intervals. The working status information includes the working load of the static relay server or a working load of the dynamic relay server. Or the static relay server or the dynamic relay server outputs the working status information to the cloud server when the working load of the static relay server or the working load of the dynamic relay server is heavier than the predetermined load.

The plurality of user devices connected to the dynamic relay server are high-priority user devices. The dynamic relay server preferentially assigns resources to the high-priority user devices to conduct data transmission, or the plurality of user devices connected to the dynamic relay server outputs high-priority data under an emergency condition such that the dynamic relay server preferentially assigns the resources to the plurality of user devices being selected to conduct data transmission.

The cloud server includes a relay server manager. The relay server manager includes: a static relay server management unit, configured to store the working load of the static relay server; a dynamic relay server management unit, configured to store a working load of the dynamic relay server; a user device manager, configured to store and manage login information of the plurality of user devices and provide the plurality of user devices with a temporary verification identifier, respectively; and a request processor, coupled to the relay server manager and the user device manager and configured to receive data transmission requests outputted by the plurality of user devices and generate a plurality of server lists according to at least one of the working load of the static relay, the working load of the dynamic relay server, a position of the static relay server and a position of the dynamic relay server, wherein the plurality of server lists include a plurality of relay servers, respectively. The request processor outputs the plurality of server lists and a plurality of conversation identifiers to the plurality of user devices such that the plurality of user devices link to the plurality of relay servers corresponding thereto, respectively, according to the priority recorded in the plurality of server lists.

The static relay server includes: a first verification controller, configured to receive login information provided by the plurality of user devices and check the login information provided by the plurality of user devices with the cloud server; a first working load monitor, configured to monitor and store a present working load and output the present working load to the cloud server; and a first data transmitter, configured to transmit data outputted by the plurality of user devices to destination user devices corresponding thereto.

The dynamic relay server includes: a second verification controller, configured to receive login information provided by the at least two of the plurality of user devices, and check the login information provided by the plurality of user devices with the cloud server; a second working load monitor, configured to monitor and store a present working load, and output the present working load to the cloud server; and a second data transmitter, configured to transmit data outputted by the plurality of user devices to destination user devices corresponding thereto.

The cloud data transmission system further includes: a personal relay server, configured to enable at least two specific user devices of the plurality of user devices to conduct peer-to-peer data transmission, wherein the personal relay server outputs login information of the at least two specific user devices and identifier information of the personal relay server to the cloud server, such that the cloud server stores the identifier information into a personal relay server management unit and registers the personal relay server as an exclusive relay server for the at least two specific user devices.

The personal relay server includes: a service register, configured to output the login information of the at least two specific user devices and the identifier information to the cloud server; a third verification controller, configured to check the login information provided by the at least two specific user devices with the cloud server; a third working load monitor, configured to monitor and store a present working load, and output the present working load to the cloud server; and a third data transmitter, configured to transmit data outputted by the at least two specific user devices to destination user devices corresponding thereto.

One embodiment of the present invention provides a dynamic data flow decentralizing method for a cloud data transmission system. The dynamic data flow decentralizing method includes the following steps. A plurality of user devices output data transmission requests to a cloud server of the cloud data transmission system, respectively. The cloud server generates a plurality of server lists and outputs the plurality of server lists to the plurality of user devices corresponding thereto. The plurality of server lists includes a plurality of relay servers, respectively. The plurality of user devices links to at least one static relay server among the plurality of relay servers to conduct peer-to-peer data transmission. The cloud server detects a working load of the static relay server. The cloud server controls at least one dynamic relay server of the plurality of relay servers to switch from a standby mode to an active mode when the working load of the static relay server is heavier than a predetermined load. At least two of the plurality of user devices are connected to the dynamic relay server and share the working load of the static relay server through data transmission conducted by the dynamic relay server.

Another embodiment of the present invention provides a dynamic data flow decentralizing method for a cloud data transmission system. The dynamic data flow decentralizing method includes the following steps. At least two specific user devices output login information to a personal relay server. A service register of the personal relay server outputs the login information and identifier information of the personal relay server to a cloud server of the cloud data transmission system. The cloud server stores the identifier information in a personal relay server management unit and registers the personal relay server as an exclusive relay server for the at least two specific user devices. The cloud server generates at least one server list and outputs the at least one server list to the at least two specific user devices. The at least one server list includes the personal relay server. The at least two specific user devices link to the personal relay server to conduct peer-to-peer data transmission. The at least two specific user devices are connected to another relay server to conduct data transmission when a working load of the personal relay server is heavier than a predetermined load.

As previously stated, the present invention provides a cloud data transmission system and a dynamic data flow decentralizing method thereof, in which a working mode of a dynamic relay server is dynamically adjusted to decentralize the working load of each of the relay servers. Accordingly, the user devices in the cloud data transmission system are provided with excellent transmission quality at any time. Moreover, the dynamic relay server can switch to a standby mode during off-peak hours to reduce power consumption.

In order to further understand the techniques, means and effects of the present invention, the following detailed descriptions and appended drawings are hereby referred to, such that, and through which, the purposes, features and aspects of the present invention can be thoroughly and concretely appreciated; however, the appended drawings are merely provided for reference and illustration, without any intention to be used for limiting the present invention.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain the principles of the present invention.

FIGS. 5-1~5-2 show a flowchart of a dynamic data flow decentralizing method according to one embodiment of the present invention;

FIGS. 9-1~9-2 show a flowchart of a dynamic data flow decentralizing method according to another embodiment of the present invention.

DESCRIPTION OF THE EXEMPLARY EMBODIMENTS

The detailed description set forth below in connection with the appended drawings is intended as a description of certain embodiments of the present invention, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present invention.

While such terms as "first," "second," etc., may be used to describe various components, such components must not be limited to the above terms. The above terms are used only to distinguish one component from another. For example, a second component may be referred to as a first component within the scope of the present invention, and similarly, the first component may be referred to as the second component. As used herein, the term "and/or" includes any and all combinations of one or more of the associated listed items.

Figure 1A:
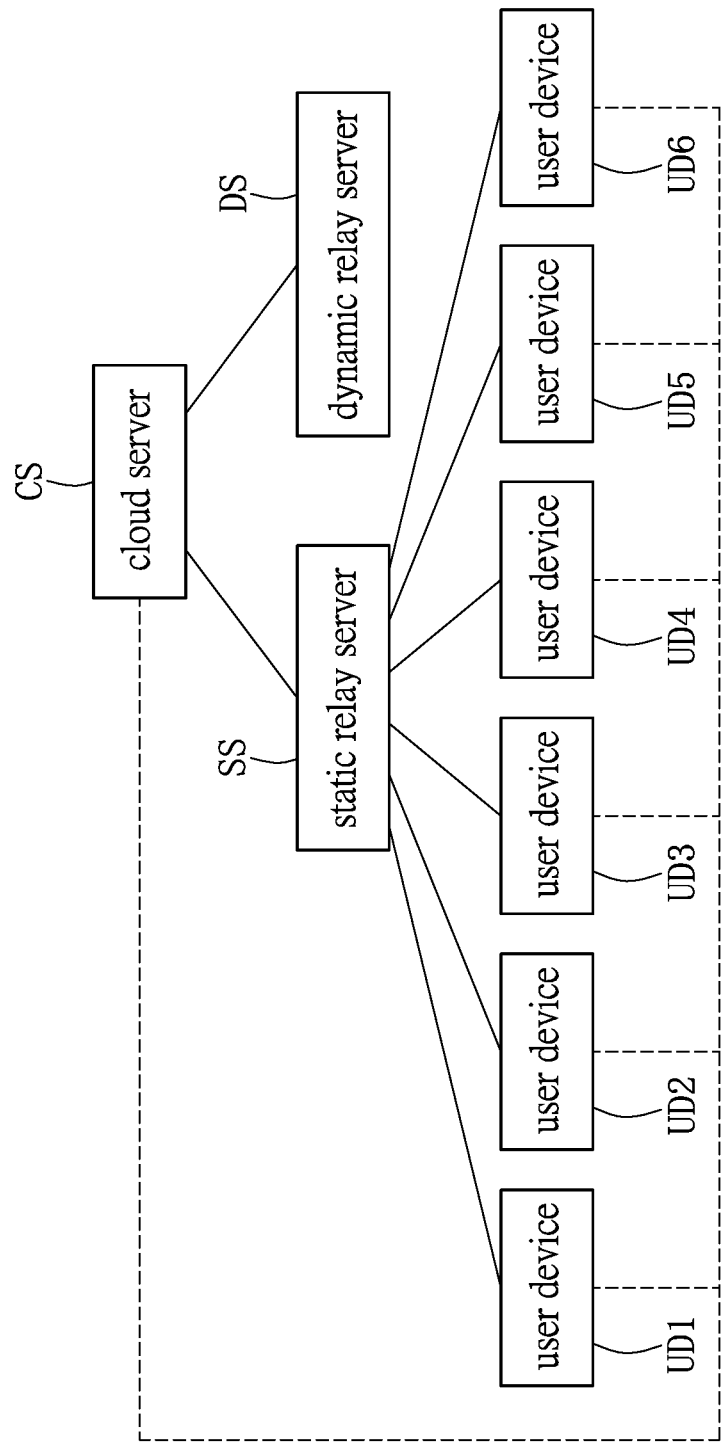
FIG. 1A is a schematic diagram of a cloud data transmission system according to one embodiment of the present invention.

Please refer to FIG. 1A, which is a schematic diagram of a cloud data transmission system according to one embodiment of the present invention. The cloud data transmission system 1 includes a cloud server CS, at least one static relay server SS, at least one dynamic relay server DS and a plurality of user devices UD1~UD6. The cloud server CS is connected to the static relay server SS, the dynamic relay server DS and the plurality of user devices UD1~UD6. The static relay server SS is connected to the plurality of user devices UD1~UD6. Incidentally, the term "connected" refers to a channel by means of wired communication media or wireless communication media, to which the present invention is not limited.

For the convenience of explanation, the cloud data transmission system 1 in FIG. 1A only includes a static relay server SS, a dynamic relay server DS and six user devices UD1~UD6. However, the present invention is not limited thereto. In other embodiments, the cloud data transmission system 1 may also include a plurality of static relay servers SS, a plurality of dynamic relay servers DS and different numbers of user devices.

The cloud data transmission system 1 facilitates the plurality of user devices UD1~UD6 to conduct peer-to-peer data transmission. For example, the user devices UD1, UD3 and UD5 conduct peer-to-peer data transmission with the user devices UD2, UD4 and UD6 through the static relay server SS, respectively, to overcome the problems related to NAT traversal or the firewall.

Figure 1B:
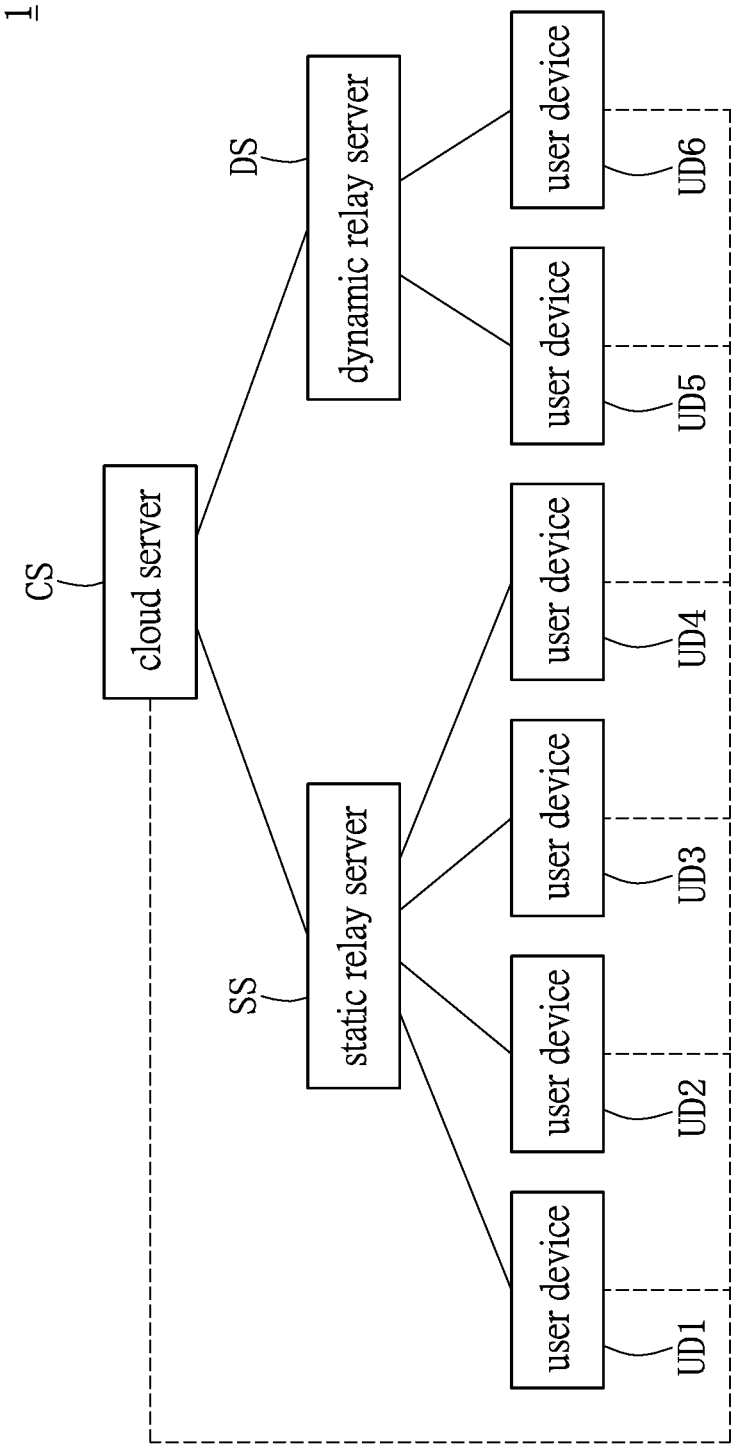
FIG. 1B is a schematic diagram of a cloud data transmission system according to another embodiment of the present invention.

It should be noted that, when the static relay server SS provides sufficient resources (such as the bandwidth) to facilitate the plurality of user devices UD1~UD6 to conduct peer-to-peer data transmission, the dynamic relay server DS stays in a standby mode to save energy. On the contrary, as shown in FIG. 1B, when the static relay server SS fails to meet the data transmission requests of the plurality of user devices UD1~UD6, the dynamic relay server DS switches from the standby mode to an active mode. Then, at least two of the plurality of user devices UD1~UD6 (for example, the user devices UD5 and UD6) are connected to the dynamic relay server DS and conduct peer-to-peer data transmission through the dynamic relay server DS.

The user devices UD1~UD6 are electronic devices such as desk-top computers, lap-top computers, smart phones or tablet computers, capable of executing applications. The user can operate the plurality of user devices UD1~UD6 to transmit or receive data. Moreover, the plurality of user devices UD1~UD6 includes a user interface, through which the user can input login information such as the account to register in the cloud server CS.

Figure 2:
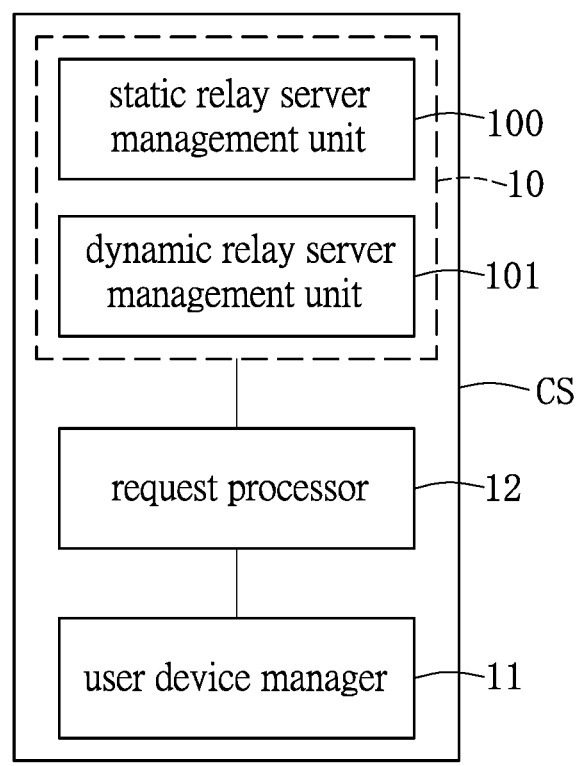
FIG. 2 is a schematic diagram of a cloud server according to one embodiment of the present invention.

Please refer to FIG. 1A and FIG. 2, where FIG. 2 is a schematic diagram of a cloud server according to one embodiment of the present invention. The cloud server CS is configured to manage and control data transmission conducted in the cloud data transmission system 1. The cloud server CS includes a relay server manager 10, a user device manager 11 and a request processor 12. The request processor 12 is coupled to the relay server manager 10 and the user device manager 11.

The relay server manager 10 includes logic and/or coding circuitry configured to manage relay servers such as the static relay server SS and the dynamic relay server DS. More particularly, the relay server manager 10 includes a static relay server management unit 100 and a dynamic relay server management unit 101. The static relay server management unit 100 is connected to the static relay server SS, while the dynamic relay server management unit 101 is connected to the dynamic relay server DS.

The static relay server management unit 100 includes logic and/or coding circuitry configured to store the working load of the static relay server SS. The dynamic relay server management unit 101 includes logic and/or coding circuitry configured to store the working load of the dynamic relay server DS. The user device manager 11 includes logic and/or coding circuitry configured to store and manage the login information provided by the plurality of user devices UD1~UD6.

The request processor 12 includes logic and/or coding circuitry configured to receive data transmission requests outputted by the plurality of user devices UD1~UD6, and generate a plurality of server lists according to the priority of the plurality of user devices UD1~UD6, the working load of the static relay server SS, the working load of the dynamic relay server DS, and at least one of a position of the static relay server SS and a position of the dynamic relay server DS. The number of server lists corresponds to the number of user devices UD1~UD6. The plurality of server lists includes a plurality of relay servers, respectively, and the plurality of server lists arranges the priority of the plurality of relay servers. After the plurality of user devices UD1~UD6 receive the corresponding server lists, the plurality of user devices UD1~UD6 link to the plurality of relay servers corresponding thereto, respectively, according to the priority recorded in the server lists.

For example, if the present working load of the static relay server SS is lighter than a predetermined load, and the position of the static relay server SS is closer than the dynamic relay server DS to the user devices UD1~UD2, the request processor 12 will determine that the static relay server SS is, in the meantime, the most suitable relay server for the user devices UD1~UD2. Therefore, among the server lists received by the user devices UD1~UD2, the static relay server SS has higher priority than the dynamic relay server DS.

In other embodiments, during the generation of the server lists, the request processor 12 may only take the working load of the static relay server SS and the working load of the dynamic relay server DS into account, instead of the position of the static relay server SS and the position of the dynamic relay server DS.

Figure 3:
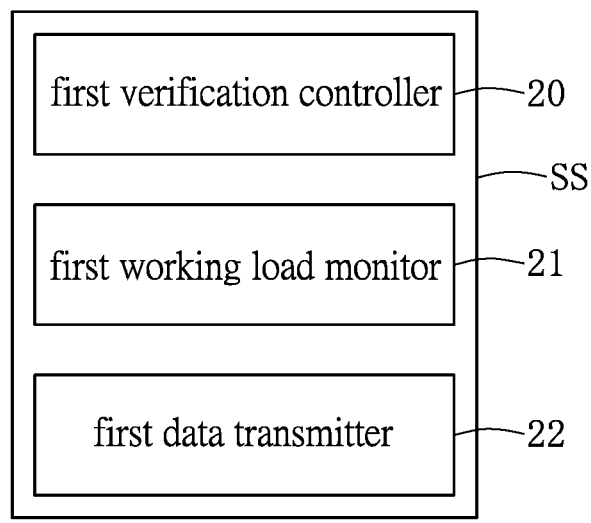
FIG. 3 is a schematic diagram of a static relay server according to one embodiment of the present invention.

Please refer to FIG. 1A and FIG. 3, where FIG. 3 is a schematic diagram of a static relay server according to one embodiment of the present invention. The static relay server SS includes a first verification controller 20, a first working load monitor 21 and a first data transmitter 22. The first verification controller 20 includes logic and/or coding circuitry configured to receive the login information provided by the plurality of user devices UD1~UD6 and check the login information provided by the plurality of user devices UD1~UD6 with the cloud server CS.

The first working load monitor 21 includes logic and/or coding circuitry configured to monitor and store the present working load of the static relay server SS and output the present working load to the cloud server CS.

The first data transmitter 22 includes logic and/or coding circuitry configured to receive data outputted by the plurality of user devices UD1~UD6 and transmit the data to the corresponding destination user devices according to the destination address in the data so as to conduct peer-to-peer data transmission.

Figure 4:
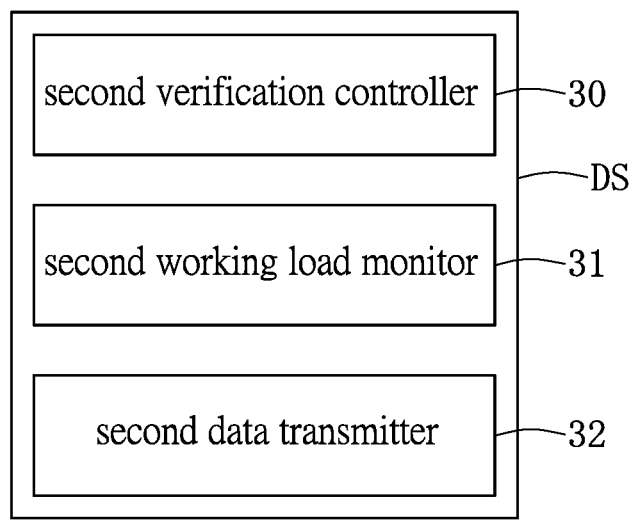
FIG. 4 is a schematic diagram of a dynamic relay server according to one embodiment of the present invention.

Please refer to FIG. 1A and FIG. 4, where FIG. 4 is a schematic diagram of a dynamic relay server according to one embodiment of the present invention. The dynamic relay server DS includes a second verification controller 30, a second working load monitor 31 and a second data transmitter 32. The second verification controller 30, the second working load monitor 31 and the second data transmitter 32 function similarly to the first verification controller 20, the first working load monitor 21 and the first data transmitter 22, respectively, as shown in FIG. 3. Accordingly, detailed descriptions thereof are not repeated.

The dynamic relay server DS is different from the static relay server SS in that the static relay server SS stays in an active mode and the dynamic relay server DS switches between a standby mode and an active mode according to the working load of the static relay server SS. When the dynamic relay server DS operates in the active mode, the dynamic relay server DS facilitates the plurality of user devices UD1~UD6 to conduct peer-to-peer data transmission so as to share the working load of the static relay server SS to achieve data flow decentralization.

Figures 1, 5:
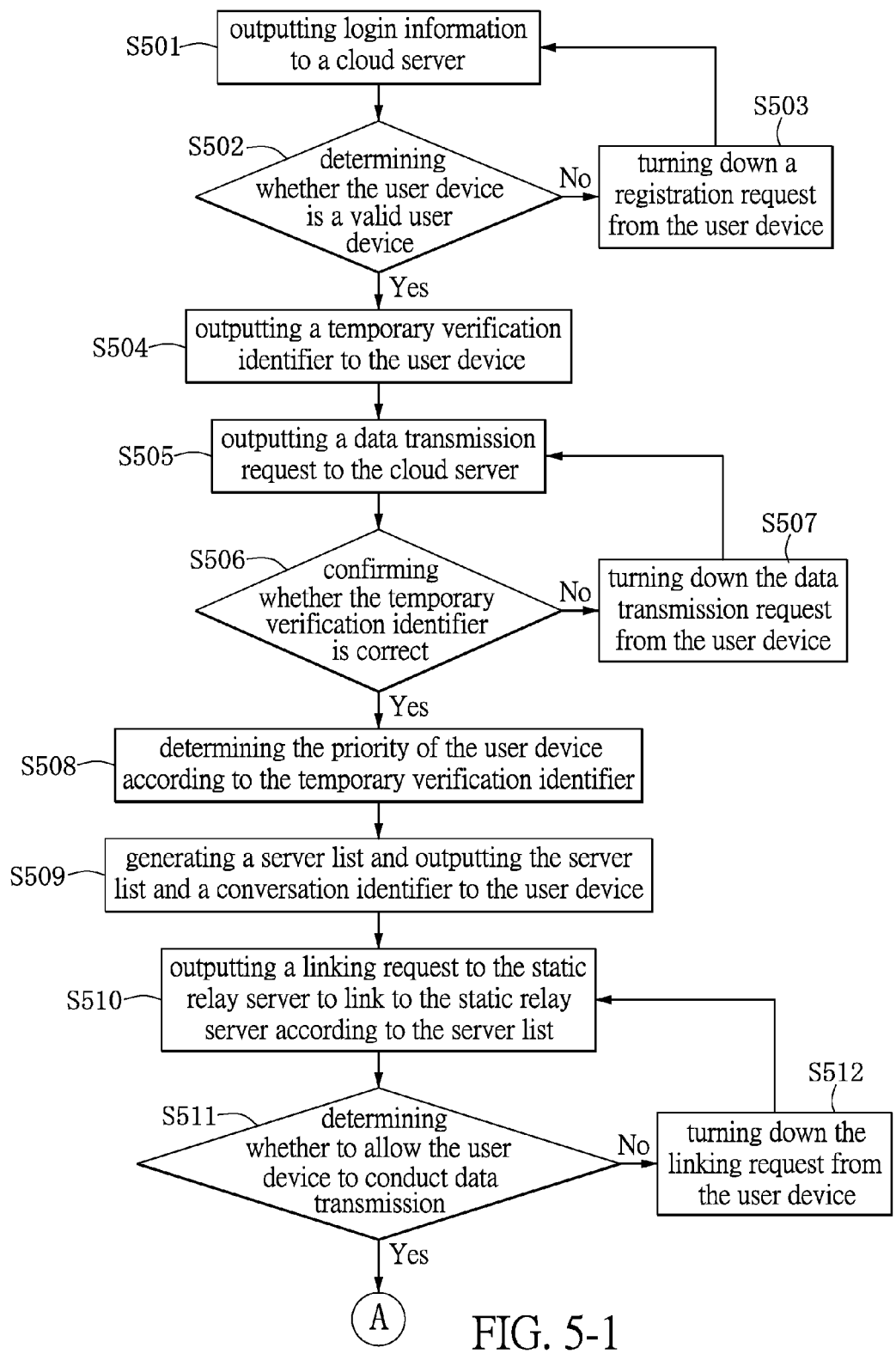
Figures 2, 5:
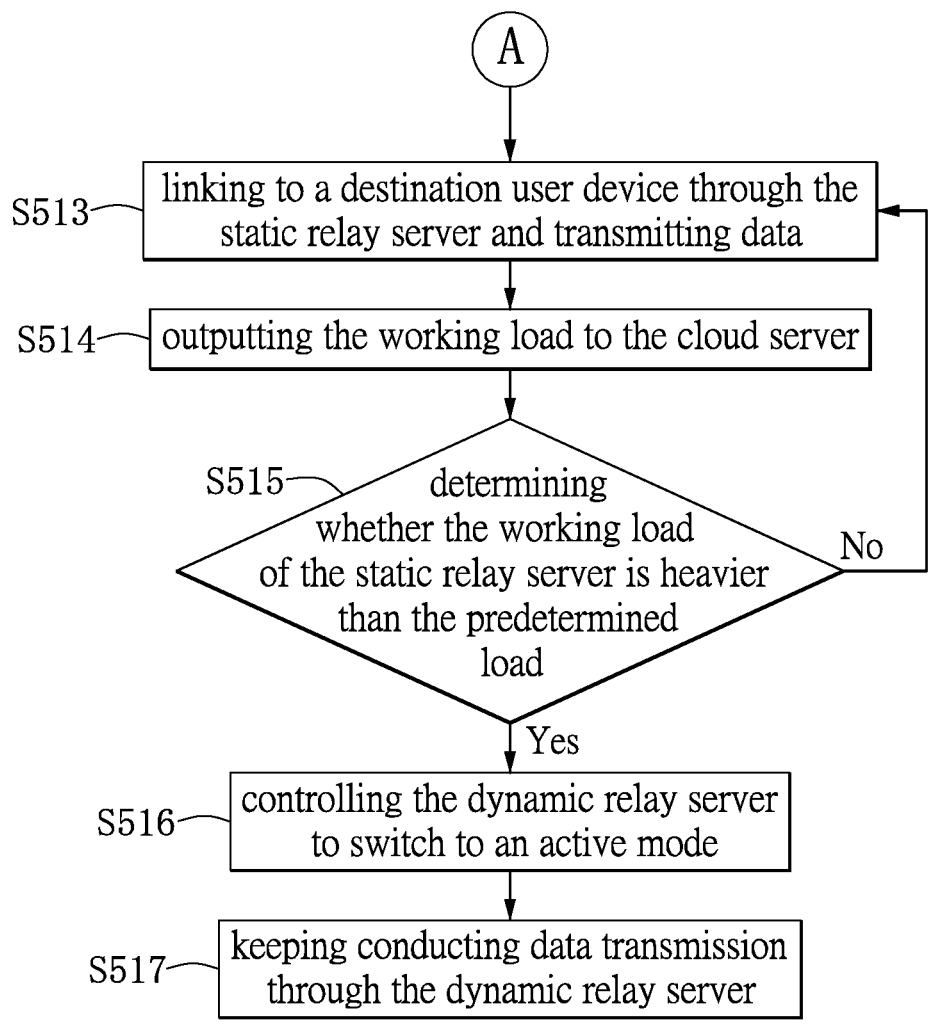

The operation of the cloud data transmission system 1 will be further described herein. Please refer to FIG. 1A and FIGS. 5-1~5-2, where FIGS. 5-1~5-2 show a flowchart of a dynamic data flow decentralizing method according to one embodiment of the present invention. The dynamic data flow decentralizing method in FIGS. 5-1~5-2 is applicable to the cloud data transmission system 1 in FIG. 1A. In Step S501, when a user device (for example, the user device UD1) is turned on, the user device UD1 outputs login information to the cloud server CS to register in the cloud server CS. In Step S502, the user device manager 11 of the cloud server CS determines whether the user device UD1 is a valid user device. If the user device manager 11 determines that the user device UD1 is not a valid user device, the method proceeds to Step S503. On the contrary, if the user device manager 11 determines that the user device UD1 is a valid user device, the method proceeds to Step S504.

In Step S503, the cloud server CS turns down a registration request from the user device UD1. Then, returning to Step S501, the cloud server CS receives a registration request from a next user device (for example, the user device UD2).

In Step S504, the user device manager 11 of the cloud server CS accepts the registration of the user devices UD1, and outputs a temporary verification identifier to the user devices UD1. The temporary verification identifier verifies that the user device UD1 has successfully registered in the user device manager 11. The temporary verification identifier is time-sensitive. Before the expiration date of the temporary verification identifier, the user device UD1 can use the temporary verification identifier to conduct data transmission with other user devices. On the other hand, the user device manager 11 stores the temporary verification identifier until the temporary verification identifier expires.

In Step S505, the user device UD1 outputs a data transmission request to the cloud server CS. In Step S506, the request processor 12 of the cloud server CS confirms with the user device manager 11 whether the temporary verification identifier provided by the user device UD1 is correct. If the temporary verification identifier provided by the user device UD1 does not conform to the temporary verification identifier stored in the user device manager 11, the method proceeds to Step S507. On the contrary, if the temporary verification identifier provided by the user device UD1 is the same as the temporary verification identifier stored in the user device manager 11, the method proceeds to Step S508. In Step S507, the cloud server CS turns down the data transmission request issued by the user device UD1. Then, returning to Step S505, the cloud server CS receives the data transmission request issued by the user device UD1 again or the data transmission request issued by other user devices.

In Step S508, the request processor 12 of the cloud server CS determines the priority of the user device UD1 according to the temporary verification identifier. More particularly, the priority of the user device UD1 varies with the type of the user device UD1. The user device UD1 may be of a general user or of a VIP user. The priority of a VIP user is higher than the priority of a general user. Alternatively, the data outputted by the user device UD1 under an emergency condition has higher priority. According to the temporary verification identifier provided by the user device UD1, the request processor 12 determines the priority of the user device UD1.

In Step S509, the request processor 12 of the cloud server CS generates a server list and outputs the server list and a conversation identifier to the user device UD1 according to the priority of the temporary verification identifier, the working load of the static relay server SS, the working load of the dynamic relay server DS, and at least one of the position of the static relay server SS and the position of the dynamic relay server DS. The conversation identifier indicates the time the request processor 12 allows the user device UD1 to communicate with the corresponding relay server. The conversation identifier is also time-sensitive. The user device UD1 links to the corresponding relay server according to the priority recorded in the server list.

For example, when the user device UD1 is a general user, the request processor 12 assigns the static relay server SS with lighter working load to the user devices UD1. When the cloud data transmission system 1 includes a plurality of static relay servers SS and the working loads of the plurality of the static relay servers SS are the same, the request processor 12 assigns the static relay server SS that is less distant to the user device UD1 to the user devices UD1.

When the user device UD1 meets a pre-determined emergency condition (for example, a fire being detected), the data provided by the user device UD1 has higher priority. At the meantime, the request processor 12 preferentially assigns the static relay server SS with a lighter working load to the user device UD1. Alternatively, when the dynamic relay server DS switches to the active mode, the request processor 12 controls the user device UD1 to be connected to the dynamic relay server DS. The dynamic relay server DS preferentially assigns resources to the user device UD1 to conduct data transmission.

When the user device UD1 is a high-priority user device, the request processor 12 preferentially assigns the static relay server SS with a lighter working load to the user device UD1. Alternatively, when the dynamic relay server DS switches to the active mode, the request processor 12 controls the user device UD1 to be connected to the dynamic relay server DS. The dynamic relay server DS preferentially assigns resources to the user device UD1 to conduct data transmission.

In Step S510, the user device UD1 outputs a linking request to the static relay server SS to link to the static relay server SS according to the server list. The linking request includes the login information of the user devices UD1, the conversation identifier and the temporary verification identifier. In Step S511, the first verification controller 20 of the static relay server SS checks the login information, the conversation identifier, and the temporary verification identifier with the user device manager 11 of the cloud server CS, and determines whether to allow the user device UD1 to conduct data transmission. If the login information, the conversation identifier, and the temporary verification identifier received by the first verification controller 20 do not conform to the information stored in the user device manager 11 of the cloud server CS, the method proceeds to Step S512. On the contrary, if the login information, the conversation identifier, and the temporary verification identifier received by the first verification controller 20 conform to the information stored in the user device manager 11 of the cloud server CS, the method proceeds to Step S513. In Step S512, the static relay server SS turns down the linking request from the user device UD1 and the method returns to Step S510 to receive a linking request from a next user device.

In Step S513, the user device UD1 links to a destination user device (for example, the user device UD2) through the first data transmitter 22 of the static relay server SS, and transmits data to the user device UD2.

In Step S514, the first working load monitor 21 of the static relay server SS outputs the working load to the cloud server CS. More particularly, the first working load monitor 21 of the static relay server SS outputs working status information to the cloud server CS at regular time intervals. The working status information includes the working load of the static relay server SS and the operation of the static relay server SS.

In other embodiments, the cloud data transmission system 1 may also be configured such that the first working load monitor 21 of the static relay server SS outputs the working status information to the cloud server CS when the working load of the static relay server SS is heavier than a predetermined load. Incidentally, the present invention is not limited to the value of the predetermined load, and a person with ordinary skill in the art may make any modifications of the predetermined load according to practical demands.

In Step S515, the static relay server management unit 100 of the relay server manager 10 of the cloud server CS stores the working load of the static relay server SS, and determines whether the working load of the static relay server SS is heavier than the predetermined load. If the working load of the static relay server SS is not heavier than the predetermined load, the method returns to Step S513 such that the user device UD1 keeps conducting peer-to-peer data transmission with the user device UD2 through the static relay server SS. On the contrary, if the working load of the static relay server SS is heavier than the predetermined load, the method proceeds to Step S516.

In Step S516, the cloud server CS controls the dynamic relay server DS to switch from a standby mode to an active mode. In Step S517, at least two of the user devices (for example, the user devices UD5 and UD6) are connected to the dynamic relay server DS according to the server list, and keep conducting data transmission through the dynamic relay server DS. The user devices UD5 and UD6 may be high-priority user devices or general user devices.

It should be noted that, similarly, the second working load monitor 31 of the dynamic relay server DS outputs working status information to the cloud server CS at regular time intervals so as to report the working load and the operation thereof to the cloud server CS.

Accordingly, the dynamic data flow decentralizing method according to the present embodiment is capable of dynamically adjusting the working mode of the dynamic relay server DS. The dynamic relay server DS facilitates the static relay server SS to conduct data transmission during peak hours, while switching to the standby mode during off-peak hours to save energy. Therefore, the dynamic data flow decentralizing method according to the present embodiment is capable of providing the plurality of user devices UD1~UD6 with good transmission quality.

Figure 6:
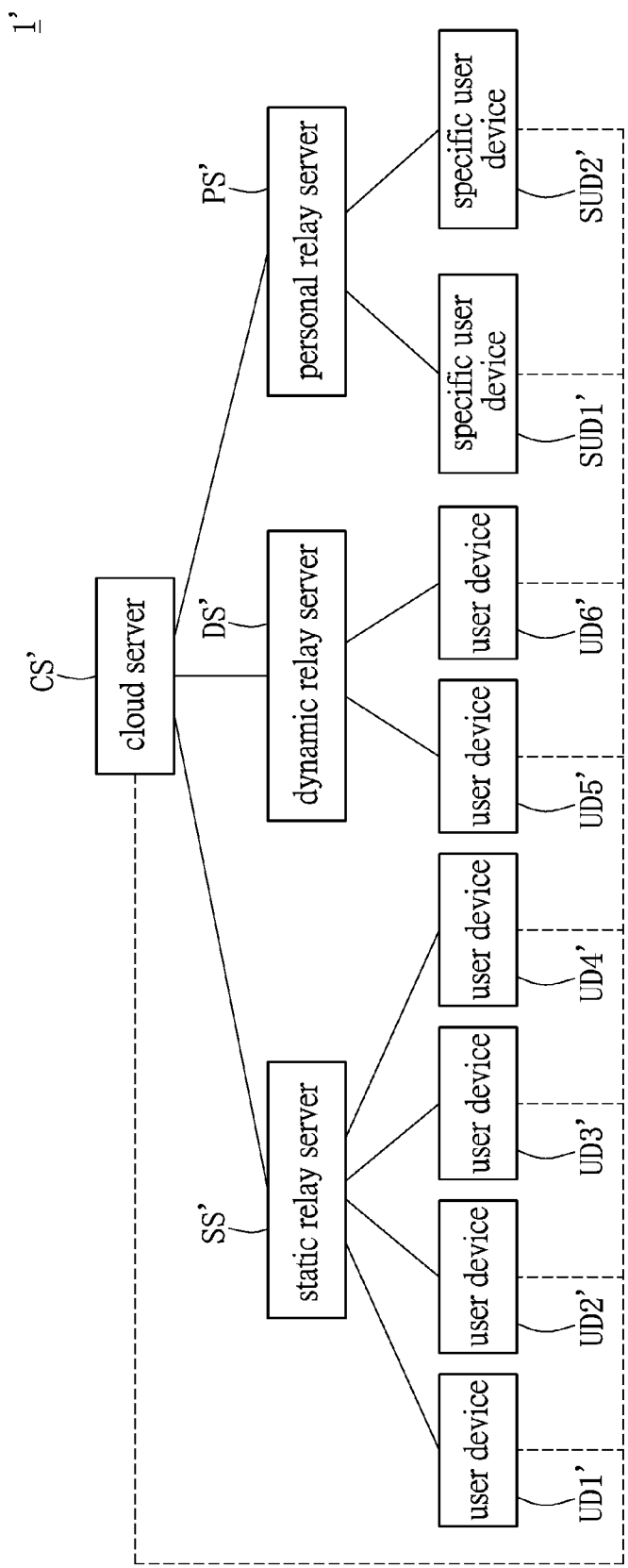
FIG. 6 is a schematic diagram of a cloud data transmission system according to another embodiment of the present invention.

With reference to FIG. 6, FIG. 6 is a schematic diagram of a cloud data transmission system according to another embodiment of the present invention. Like the cloud data transmission system 1 in FIG. 1B, the cloud data transmission system 1' in FIG. 6 also includes a cloud server CS', at least one static relay server SS', at least one dynamic relay server DS' and a plurality of user devices UD1'~UD6'. The cloud server CS', the static relay server SS', the dynamic relay server DS' and the plurality of user devices UD1'~UD6' are linked and function in a similar way to the cloud server CS, the static relay server SS, the dynamic relay server DS and the plurality of user devices UD1~UD6 in FIG. 1A, and thus descriptions thereof are not repeated except for the difference therebetween.

The cloud data transmission system 1' in FIG. 6 is different from the cloud data transmission system 1 in FIG. 1A in that the cloud data transmission system 1' in FIG. 6 further includes a personal relay server PS' and specific user devices SUD1'~SUD2'. The personal relay server PS' is connected to the cloud server CS' and the specific user devices SUD1'~SUD2'.

The specific user devices SUD1'~SUD2' are configured similar to other user devices UD1'~UD6'. The user can operate the specific user devices SUD1'~SUD2' to transmit or receive data, or input the login information to register in the cloud server CS' through the user interfaces of the specific user devices SUD1'~SUD2'.

Figure 7:
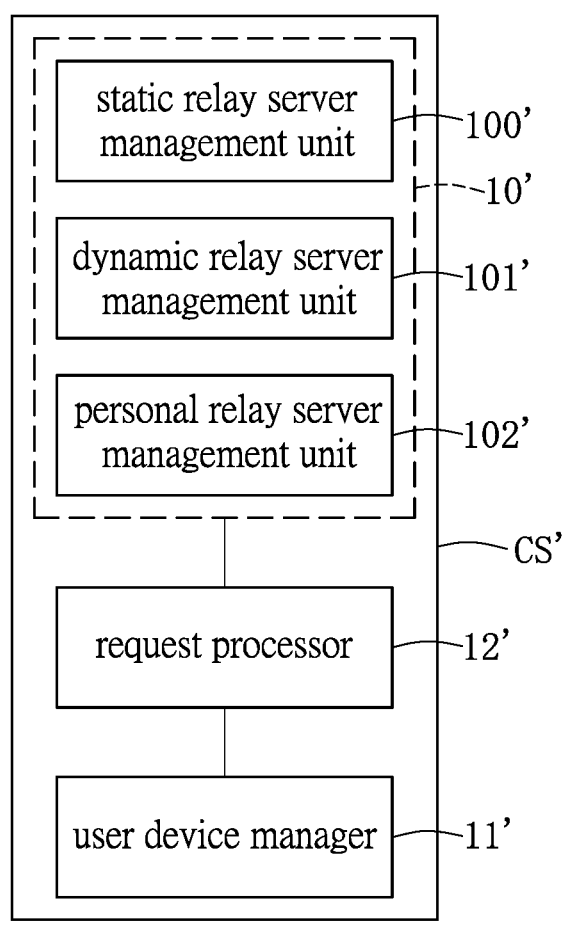
FIG. 7 is a schematic diagram of a cloud server according to another embodiment of the present invention.

Please refer to FIG. 6 and FIG. 7, where FIG. 7 is a schematic diagram of a cloud server according to another embodiment of the present invention. The cloud server CS' in FIG. 7 includes a relay server manager 10', a user device manager 11' and a request processor 12'. The relay server manager 10', the user device manager 11' and the request processor 12' in FIG. 7 are linked and function in a similar way to the relay server manager 10, the user device manager 11 and the request processor 12 in FIG. 2, and thus descriptions thereof are not repeated except for the difference therebetween.

In addition to a static relay server management unit 100' and a dynamic relay server management unit 101', the relay server manager 10' further includes a personal relay server management unit 102'. The personal relay server management unit 102' is connected to the personal relay server PS'. The personal relay server management unit 102' includes logic and/or coding circuitry configured to store a working load of the personal relay server PS'.

Figure 8:
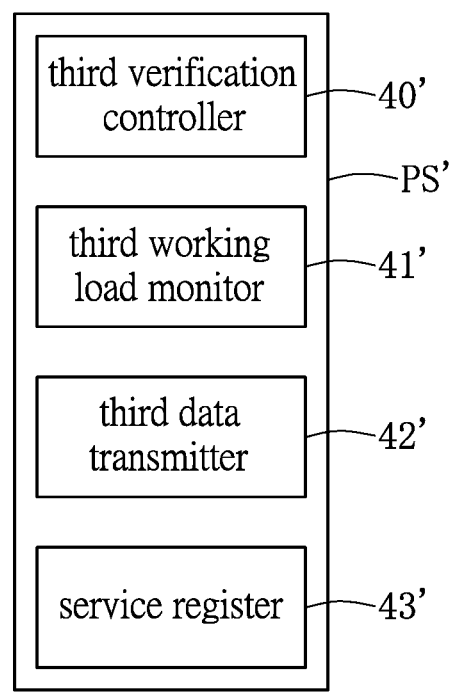
FIG. 8 is a schematic diagram of a personal relay server according to another embodiment of the present invention.

Please refer to FIG. 6 and FIG. 8, where FIG. 8 is a schematic diagram of a personal relay server according to another embodiment of the present invention. The personal relay server PS' is, for example, a personal cloud, a network attached storage (NAS) server, a network video recorder (NVR) or a router. The personal relay server PS' is different from the static relay server SS and the dynamic relay server DS in that the personal relay server PS' is not a public relay server. A general user device cannot link to the personal relay server PS' freely. The personal relay server PS' includes a third verification controller 40', a third working load monitor 41', a third data transmitter 42' and a service register 43'. The third verification controller 40', the third working load monitor 41' and the third data transmitter 42' function similarly to the first verification controller 20, the first working load monitor 21 and the first data transmitter 22, respectively, as shown in FIG. 3. Accordingly, detailed descriptions thereof are not repeated.

The service register 43' includes logic and/or coding circuitry configured to receive login information of the specific user devices SUD1'~SUD2', and then output the login information of the specific user devices and the identifier information of the personal relay server PS' to the cloud server CS' so as to register the personal relay server PS' as an exclusive relay server for the specific user devices SUD1'~SUD2'. The identifier information of the personal relay server PS' includes, for example, an identifier and the IP address of the personal relay server PS'.

Figures 1, 9:
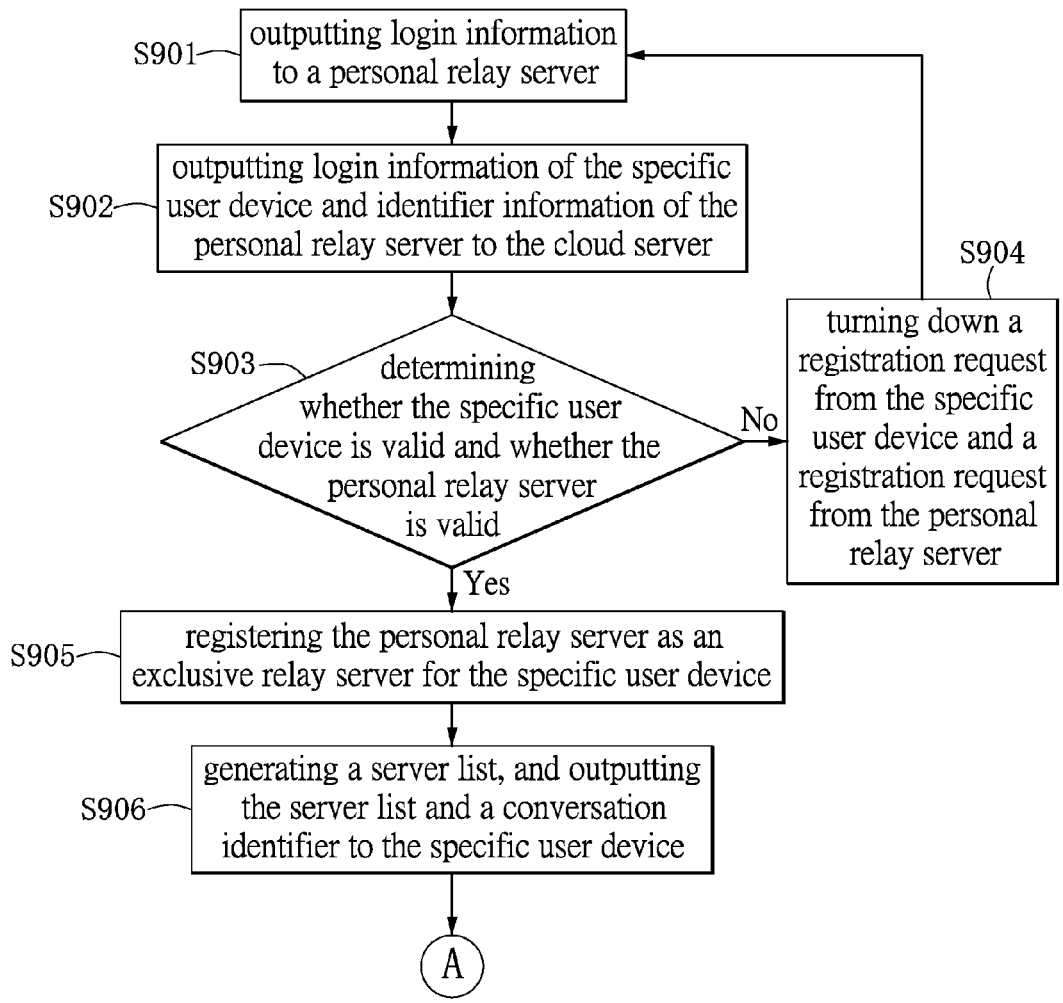
Figures 2, 9:
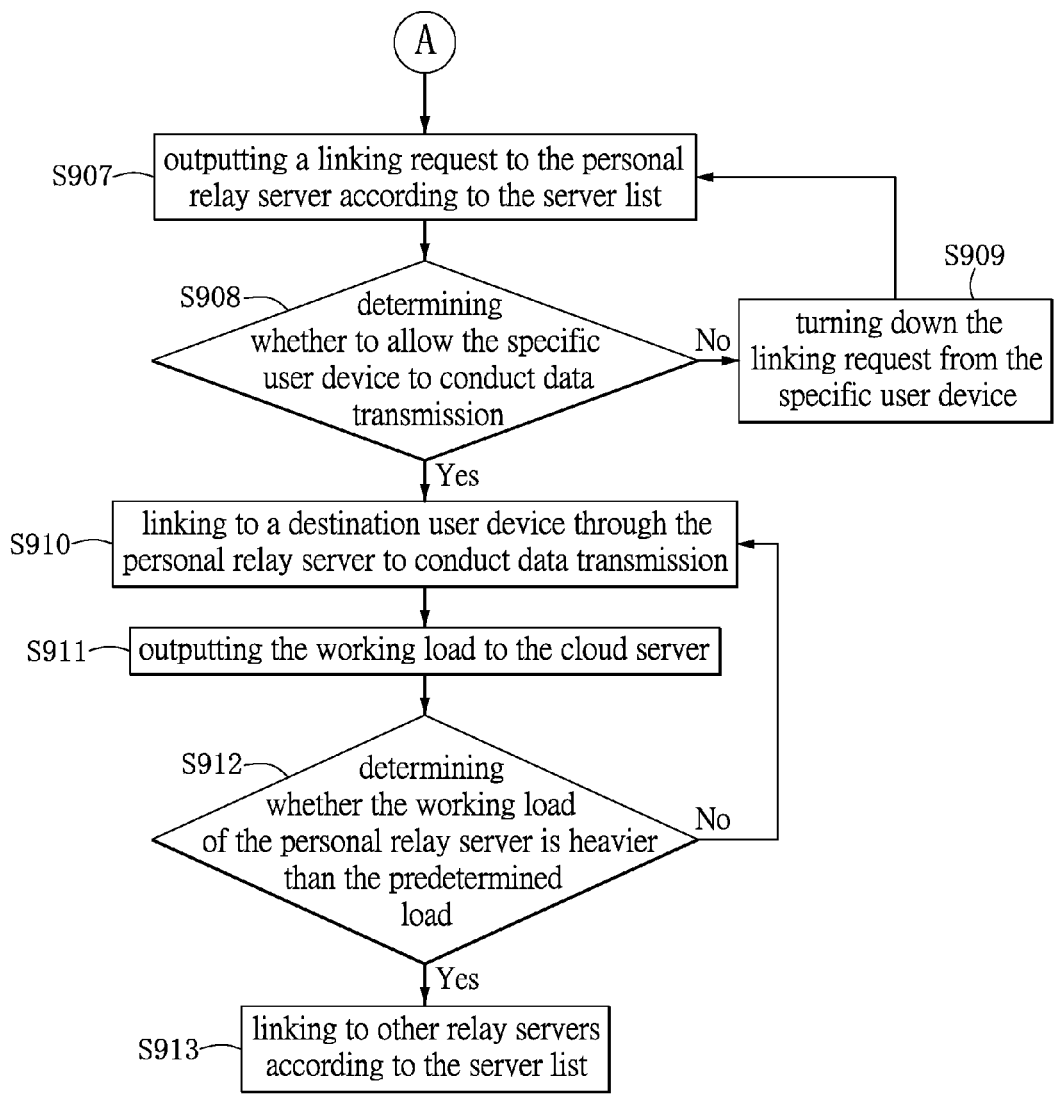

The operation of the cloud data transmission system 1' will be further described herein. Please refer to FIG. 6 and FIGS. 9-1~9-2, where FIGS. 9-1~9-2 show a flowchart of a dynamic data flow decentralizing method according to another embodiment of the present invention. The dynamic data flow decentralizing method in FIGS. 9-1~9-2 is applicable to the cloud data transmission system 1' in FIG. 6. In Step S901, at least two specific user devices SUD1'~SUD2' output login information to a personal relay server PS'. In the present embodiment, the cloud data transmission system 1' only includes two specific user devices SUD1'~SUD2'. In other words, the personal relay server PS' is only in charge of data transmission for the specific user devices SUD1'~SUD2'. In other embodiments, the personal relay server PS' may also facilitate a plurality of specific user devices SUD1'~SUD2' to conduct data transmission.

Taking the specific user device SUD1' for example, in Step S902, a service register 43' of the personal relay server PS' outputs login information of the specific user device SUD1' and identifier information of the personal relay server PS' to the cloud server CS' so as to register in the cloud server CS'. In Step S903, the user device manager 11' of the cloud server CS' determines whether the specific user device SUD1' is a valid user device, and determines whether the personal relay server PS' is a valid relay server. If the user device manager 11' determines that the specific user device SUD1' is not a valid user device or the personal relay server PS' is not a valid relay server, the method proceeds to Step S904. On the contrary, if the user device manager 11' determines that the specific user device SUD1' is a valid user device and the personal relay server PS' is a valid relay server, the method proceeds to Step S905.

In Step S904, the user device manager 11' turns down a registration request from the specific user device SUD1' and a registration request from the personal relay server PS'. Then, returning to Step S901, the cloud server CS' receives a registration request from a next specific user device (for example, the specific user device SUD2').

In Step S905, the user device manager 11' registers the personal relay server PS' as an exclusive relay server for the specific user device SUD1', and outputs the identifier information of the personal relay server PS' to the personal relay server management unit 102' of the cloud server CS'. Then, the user device manager 11' outputs a temporary verification identifier to the specific user device SUD1'. In Step S906, the request processor 12' of the cloud server CS' generates a server list, and outputs the server list and a conversation identifier to the specific user device SUD1'. The server list includes the personal relay server PS' and other relay servers (for example, the static relay server SS' and the dynamic relay server DS'). The personal relay server PS' has higher priority than the other relay servers. In other words, the specific user device SUD1' preferentially uses the personal relay server PS' to conduct peer-to-peer data transmission. When the personal relay server PS' breaks down and fails to function normally, the specific user device SUD1' transmits data through other relay servers.

In Step S907, the specific user device SUD1' outputs a linking request to the personal relay server PS' according to the server list. The linking request includes login information of the specific user device SUD1', a conversation identifier and a temporary verification identifier. In Step S908, the third verification controller 40' of the personal relay server PS' checks the login information, the conversation identifier, and the temporary verification identifier with the cloud server CS', and determines whether to allow the specific user device SUD1' to conduct data transmission.

If the login information, the conversation identifier, and the temporary verification identifier received by the third verification controller 40' do not conform to the information stored in the user device manager 11' of the cloud server CS', the method proceeds to Step S909. On the contrary, if the login information, the conversation identifier, and the temporary verification identifier received by the third verification controller 40' conform to the information stored in the user device manager 11' of the cloud server CS', the method proceeds to Step S910.

In Step S909, the personal relay server PS' turns down the linking request from a user device. In other words, the personal relay server PS' determines that the user device is not the specific user device SUD1', and thus the user device is not allowed to access the personal relay server PS'. Then, the method returns to Step S907 to receive a linking request from a next user device.

In Step S910, the specific user device SUD1' links to a destination user device (for example, the user device SUD2') through the third data transmitter 42' of the personal relay server PS' to conduct data transmission.

In Step S911, the third working load monitor 41' of the personal relay server PS' outputs the working load to the cloud server CS'. More particularly, the third working load monitor 41' of the personal relay server PS' outputs working status information to the cloud server CS' at regular time intervals. The working status information includes the working load of the personal relay server PS' and the operation of the personal relay server PS'.

In other embodiments, the cloud data transmission system 1' may also be configured such that the third working load monitor 41' of the personal relay server PS' outputs the working status information to the cloud server CS' when the working load of the personal relay server PS' is heavier than a predetermined load.

In Step S912, the personal relay server management unit 102' of the relay server manager 10' of the cloud server CS' stores the working load of the personal relay server PS', and determines whether the working load of the personal relay server PS' is heavier than the predetermined load. If the working load of the personal relay server PS' is not heavier than the predetermined load, the method returns to Step S910 such that the specific user device SUD1' keeps conducting peer-to-peer data transmission with the destination user device through the personal relay server PS'. On the contrary, if the working load of the personal relay server PS' is heavier than the predetermined load, the method proceeds to Step S913. In Step S913, the specific user device SUD1' links to other relay servers according to the server list and conducts data transmission through other relay servers.

As previously stated, the present invention provides a cloud data transmission system and a dynamic data flow decentralizing method thereof, in which a working mode of a dynamic relay server is dynamically adjusted to decentralize the working load of each of relay servers. Accordingly, the user devices in the cloud data transmission system are provided with excellent transmission quality at any time. Moreover, the dynamic relay server can switch to a standby mode during off-peak hours to reduce power consumption.

On the other hand, the cloud data transmission system allows the user devices to be provided with personal relay servers. The user devices may use the personal relay servers to conduct peer-to-peer data transmission without other user devices sharing the bandwidth of the static relay server or the bandwidth of the dynamic relay server.

The above-mentioned descriptions represent merely the exemplary embodiment of the present invention, without any intention to limit the scope of the present invention thereto. Various equivalent changes, alterations or modifications based on the claims of present invention are all consequently viewed as being embraced by the scope of the present invention.

What is claimed is:

1. A cloud data transmission system, characterized in that said cloud data transmission system comprises:
   at least one static relay server, connected to a plurality of user devices and configured to facilitate said plurality of user devices to conduct peer-to-peer data transmission;
   at least one dynamic relay server, configured to switch a working mode according to a working load of said static relay server and share said working load of said static relay server;
   a cloud server, connected to said static relay server, said dynamic relay server and said plurality of user devices and configured to dynamically coordinate the linkage among said static relay server, said dynamic relay server and said plurality of user devices so as to adjust said working load of said static relay server; and
   a personal relay server, configured to enable at least two specific user devices of said plurality of user devices to conduct peer-to-peer data transmission,
   wherein, when said working load of said static relay server is heavier than a predetermined load, said cloud server controls said dynamic relay server to switch from a standby mode to an active mode such that at least two of said plurality of user devices are connected to said dynamic relay server to conduct data transmission through said dynamic relay server;
   wherein, said personal relay server outputs login information of said at least two specific user devices and identifier information of said personal relay server to said cloud server, such that said cloud server stores said identifier information into a personal relay server management unit and register said personal relay server as an exclusive relay server for said at least two specific user devices;
   wherein said personal relay server includes:
      a service register, configured to output said login information of said at least two specific user devices and said identifier information to said cloud server;
      a third verification controller, configured to check said login information provided by said at least two specific user devices with said cloud server;
      a third working load monitor, configured to monitor and store a present working load, and output said present working load to said cloud server; and
      a third data transmitter, configured to transmit data outputted by said at least two specific user devices to destination user devices corresponding thereto.

2. The cloud data transmission system of claim 1, characterized in that said static relay server and said dynamic relay server output respectively working status information to said cloud server at regular time intervals, wherein said working status information comprises said working load of said static relay server or a working load of said dynamic relay server, or said static relay server or said dynamic relay server outputs said working status information to said cloud server when said working load of said static relay server or said working load of said dynamic relay server is heavier than said predetermined load.

3. The cloud data transmission system of claim 1, characterized in that said plurality of user devices connected to said dynamic relay server are high-priority user devices, and said dynamic relay server preferentially assigns resources to said high-priority user devices to conduct data transmission, or said plurality of user devices connected to said dynamic relay server outputs high-priority data under an emergency condition such that said dynamic relay server preferentially assigns said resources to said plurality of user devices being selected to conduct data transmission.

4. The cloud data transmission system of claim 1, characterized in that said cloud server comprises:
   a relay server manager comprising:
      a static relay server management unit, configured to store said working load of said static relay server; and
      a dynamic relay server management unit, configured to store a working load of said dynamic relay server;
   a user device manager, configured to store and manage login information of said plurality of user devices and provide said plurality of user devices with a temporary verification identifier, respectively; and
   a request processor, coupled to said relay server manager and said user device manager and configured to receive data transmission requests outputted by said plurality of user devices and generate a plurality of server lists according to at least one of said working load of said static relay, said working load of said dynamic relay server, a position of said static relay server and a position of said dynamic relay server, wherein said plurality of server lists comprise a plurality of relay servers, respectively;
   wherein, said request processor outputs said plurality of server lists and a plurality of conversation identifiers to said plurality of user devices such that said plurality of user devices link to said plurality of relay servers corresponding thereto, respectively, according to the priority recorded in said plurality of server lists.

5. The cloud data transmission system of claim 1, characterized in that said static relay server comprises:
   a first verification controller, configured to receive login information provided by said plurality of user devices and check said login information provided by said plurality of user devices with said cloud server;
   a first working load monitor, configured to monitor and store a present working load and output said present working load to said cloud server; and
   a first data transmitter, configured to transmit data outputted by said plurality of user devices to destination user devices corresponding thereto.

6. The cloud data transmission system of claim 1, characterized in that said dynamic relay server comprises:
   a second verification controller, configured to receive login information provided by said at least two of said plurality of user devices, and check said login information provided by said plurality of user devices with said cloud server;
   a second working load monitor, configured to monitor and store a present working load, and output said present working load to said cloud server; and
   a second data transmitter, configured to transmit data outputted by said plurality of user devices to destination user devices corresponding thereto.

* * * * *